United States Patent [19]
Burglin et al.

[11] 4,188,682
[45] Feb. 19, 1980

[54] AUTOMOBILE CLEANING AND WAXING TOOL

[76] Inventors: Robert E. Burglin, 1558 S. Anaheim Blvd., Ste. A, Anaheim, Calif. 92805; Sam S. Itaya, 420 Lakeview Rd., Pasadena, Calif. 91105

[21] Appl. No.: 900,885

[22] Filed: Apr. 28, 1978

[51] Int. Cl.² .......................... B60S 3/06; A46B 13/00
[52] U.S. Cl. ................ 15/97 R; 51/170 MT; 310/50
[58] Field of Search ............... 15/22 R, 28, 29, 97 R, 15/49 R; 310/50; 51/170 T, 170 TL, 170 MT; 173/170

[56] References Cited

U.S. PATENT DOCUMENTS

| | | | |
|---|---|---|---|
| 2,395,537 | 2/1946 | Crosby | 51/170 MT |
| 2,597,971 | 5/1952 | Burnham | 15/97 R |
| 3,336,703 | 8/1967 | Multer | 51/170 MT |
| 3,520,090 | 7/1970 | Lee | 51/170 MT |
| 3,531,812 | 10/1970 | Bailey et al. | 15/97 R |
| 3,793,776 | 2/1974 | Sadow, Jr. et al. | 51/170 MT |
| 3,849,943 | 11/1974 | Thomas et al. | 51/170 MT |

FOREIGN PATENT DOCUMENTS 455803 4/1949 Canada .......................................... 15/28

Primary Examiner—Edward L. Roberts
Attorney, Agent, or Firm—Gausewitz, Carr & Rothenberg

[57] ABSTRACT

An automobile cleaning and waxing tool that provides orbital motion of the polishing pad is formed of a two-part plastic shell and a two-part hollow handle having respective handle parts formed integrally with the shell parts. The handle completely circumscribes the housing and mounts a motor control switch within its hollow interior positioned for convenient operation by the thumb of an operator holding the polisher handle. The shell is internally configured to position and firmly support the casing of an electric motor that drives the polisher pad.

17 Claims, 7 Drawing Figures

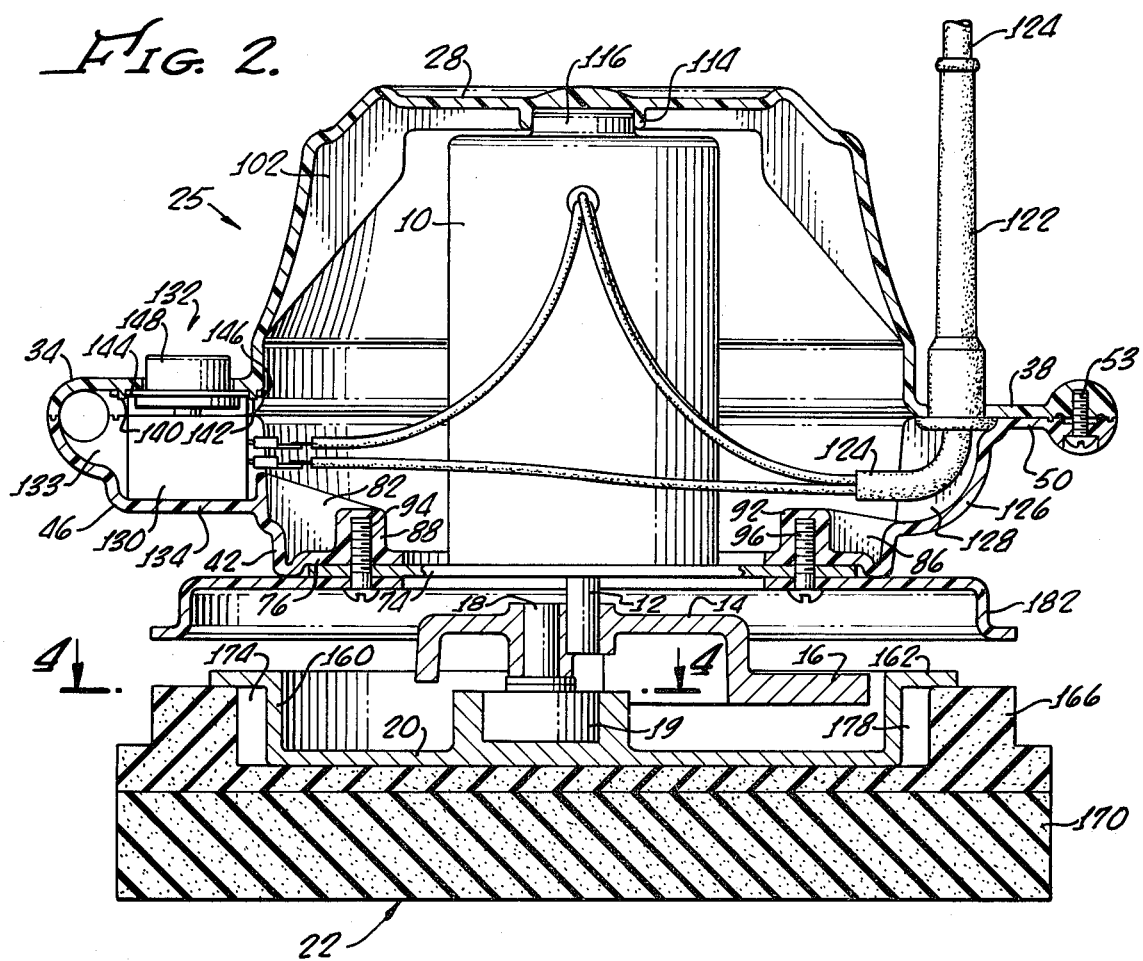
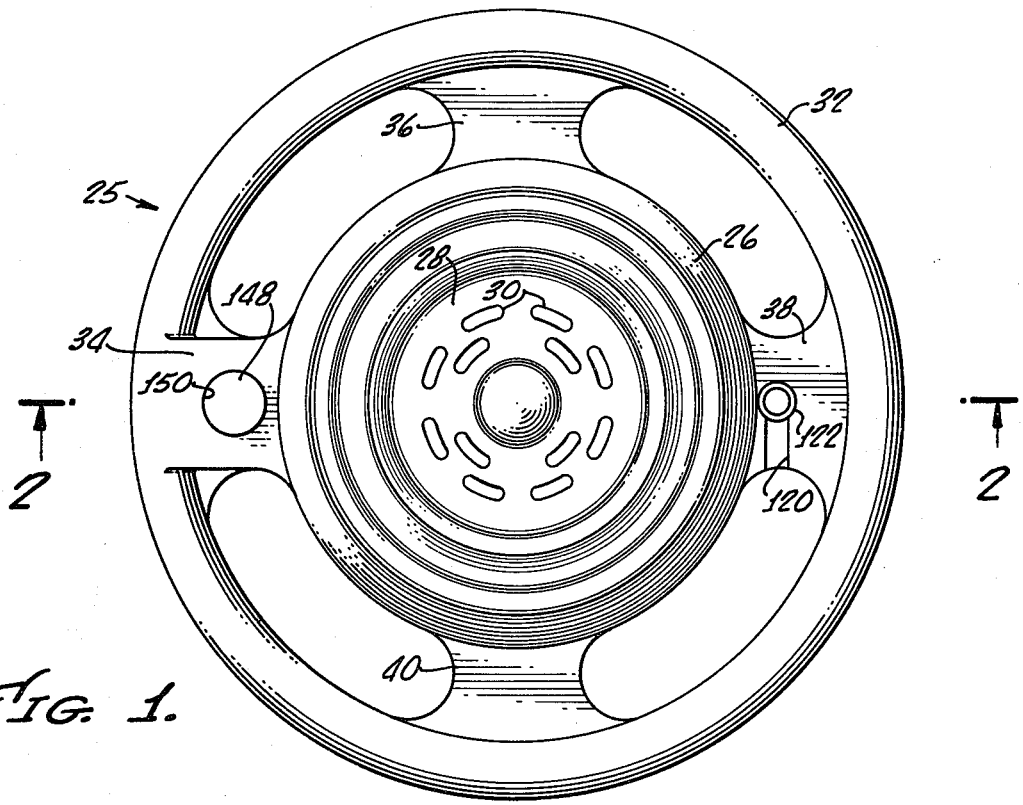

AUTOMOBILE CLEANING AND WAXING TOOL

BACKGROUND OF THE INVENTION

The present invention relates to portable cleaning and polishing machines, and more particularly concerns a hand held orbital cleaner and polisher having an improved housing for mounting the drive motor and controls therefor.

Portable cleaning and polishing machines, such as those now widely used for polishing and cleaning of automobile exterior surfaces, frequently embody an electric motor carrying an eccentrically mounted polishing pad which is driven in a noncircular or orbital motion. Typical machines of this type are shown in the U.S. Pat. Nos. to Bailey, et al 3,531,812, Stout 3,445,877, and Zaccone 3,448,476. In some of these machines a motor carries an eccentrically driven metal pan to which is secured a polishing pad. The motor is mounted within a housing that may have a skirt projecting downwardly toward the pad and one or more handles are connected to the housing to enable the machine to be held by the operator during a polishing operation. Machines of this type have frequently employed an on/off toggle type switch mounted in the housing body. This mounting makes it difficult for the operator to control the motor since such machines are sufficiently heavy and powerful to require the operator to use both hands to support and/or control the machine during operation. It is at best awkward and at worst impossible for the operator to actuate such a switch while both hands are used to support and control the motion of the polisher.

Polishing machines of this nature are heavy and subject to abuse in the field, often being dropped considerable distances to concrete surfaces. In such a fall the weight of the motor and the protrusion of handles attached to the case combine to damage the case, often forcibly separating the motor from its mounting within the case or housing, or fracturing the housing.

Where metal handles and housings are employed, the equipment is subject to shock hazard and the point of attachment of the handle to the housing is a weaker area that is subject to more frequent damage if the machine is accidentally dropped.

Accordingly, it is an object of the present invention to provide a portable polishing machine that eliminates or minimizes above-mentioned disadvantages and provides an improved housing that is more rugged, more durable, more efficient in operation and inexpensive to manufacture.

SUMMARY OF THE INVENTION

In carrying out principles of the present invention in accordance with a preferred embodiment thereof, a hand held polisher having an electric motor connected to drive a polishing pad is formed of a shell having an elongated hollow handle spaced outwardly and at least partly circumscribing the shell, the handle being formed of first and second handle parts that are joined to one another along a surface that extends longitudinally of the elongated handle and at least one of the handle parts being integral with the housing shell. Electrical elements for controlling the motor are mounted to and at least partly within the hollow handle. According to another feature of the invention, the shell is made in upper and lower parts, each having one of the hollow handle parts integral therewith, and a switch receiving cavity formed in one of the handle parts snugly receives the body of a motor controlling switch to allow an operator to actuate the switch with his thumb while firmly grasping the handle.

According to another feature of the invention, the interior of the housing is formed to snugly receive and position the motor both at upper and lower ends thereof to provide a stronger, more secure and more rugged mounting for the motor. According to another feature of the invention, a pad holder plate connected to be driven by the motor comprises a shallow cylindrical body having a flanged upper end. A plurality of circumferentially spaced cleats are fixed to the body and project radially outwardly therefrom. A resilient pad mounted to and over the cylindrical body is keyed against rotation relative to the body by the radially projecting cleats.

BRIEF DESCRIPTION OF THE DRAWINGS

FIG. 1 is a view of the rear (or top) of a cleaning and polishing machine embodying principles of the present invention;

FIG. 2 is a section taken on lines 2—2 of FIG. 1;

DETAILED DESCRIPTION

Figure 3:
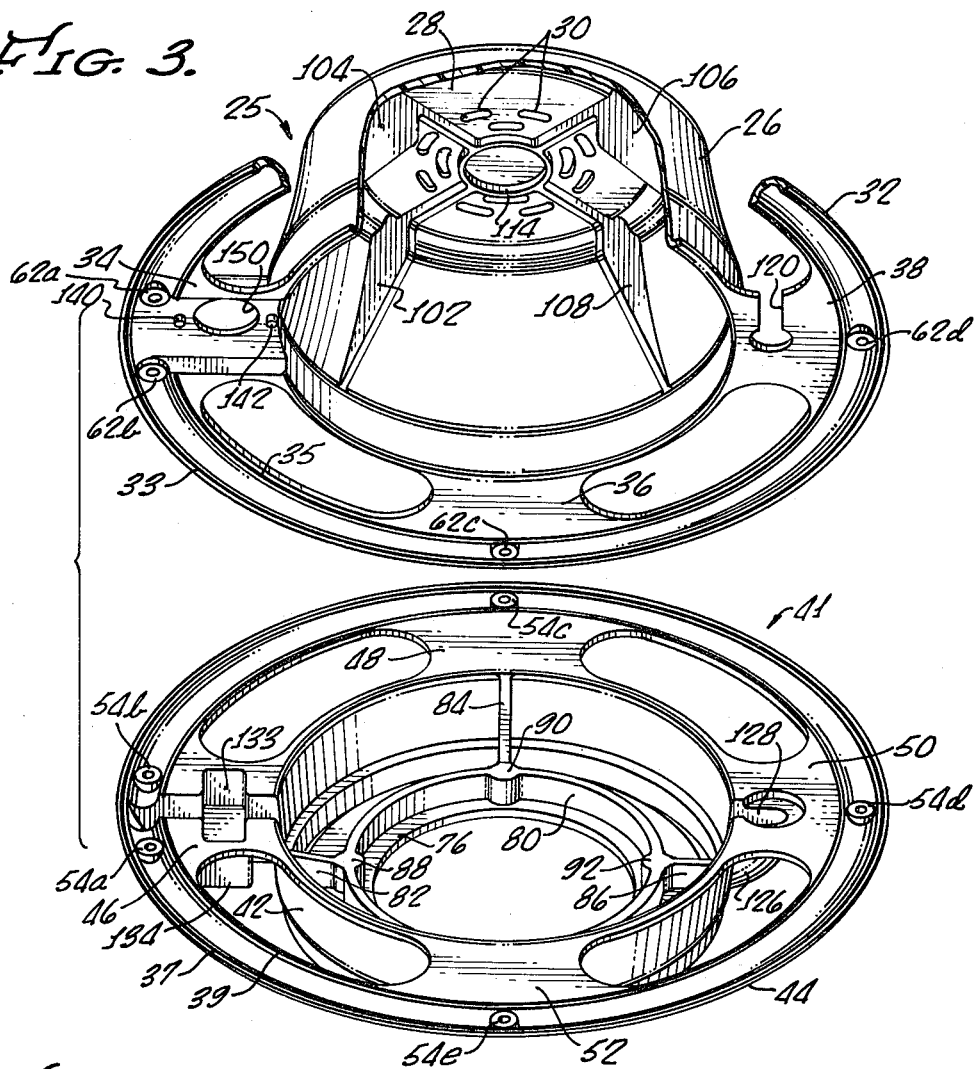
FIG. 3 is an exploded perspective view of the two housing parts of the machine of FIG. 1 with parts broken away and the motor removed to show the interior of both housing parts.
Figure 4:
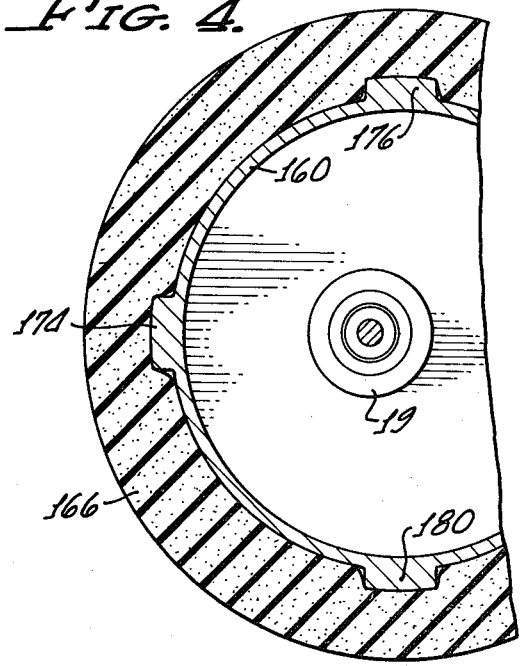
FIG. 4 is a fragmentary section taken on lines 4—4 of FIG. 2.

As shown in FIGS. 1, 2 and 3, a portable automobile cleaning and polishing machine having an orbital drive mechanism of the type shown in the above-identified United States patents embodies a motor 10 having an output drive shaft 12 to which is fixed an eccentric drive plate 14, having a counterweight 16. Fixed to eccentric drive plate 14 and extending along an axis parallel to, but laterally offset from the motor drive shaft, is a pad drive shaft 18 that, by means of a bearing 19, rotatably carries a pad plate 20 on which is mounted a polishing pad generally indicated at 22.

The motor assembly is mounted in a generally dome shaped housing that covers and protects the motor and its operating mechanism, provides convenient handles for carrying and holding the polisher during operation, and mounts electrical components for control and powering of the motor.

The housing is formed of first and second individually integral housing sections detachably connected together. As viewed in FIG. 2, and where the machine is used on a horizontal surface so that the axis of rotation of the motor is vertical, these first and second housing sections are upper and lower sections respectively. However, when the machine is used on vertical or other surfaces, neither section need be vertical. Nevertheless, for convenience, the terms "upper" and "lower" are applied to the housing sections and to other parts of the machine, but such terms are not to be considered to be limitations denoting any specific orientation. The upper housing section comprises a thin-wall upper shell part 25 having an outer peripheral side wall 26 and an upper wall, or shell top, 28 suitably apertured as indicated at 30 for ventilation. Completely circumscribing the lower end of the shell side wall 26 and radially outwardly spaced therefrom is a first downwardly concave thin-wall handle ring 32 integrally connected with the shell side wall 26 by a plurality of circumferentially spaced handle support parts 34, 36, 38 and 40.

The lower housing section comprises a thin-wall lower shell part 41 formed with an outer peripheral side wall 42 having its upper edge completely circumscribed by a handle part in the form of a circular upwardly concave thin-wall ring 44 that is integrally connected with the shell part 42 by a plurality of circumferentially spaced radially extending integral handle support parts 46, 48, 50, 52. The two shell parts 25, 41 and the integral handle ring parts 32, 44 thereof, together with the handle ring support elements, are all positioned in face-to-face juxtaposition with corresponding elements of the shell parts in mating interengagement. The two integral housing sections are fixedly interconnected to one another by means of circumferentially spaced bolts, such as bolt 53, extending through apertures in bosses 54a, 54b, 54c, 54d and 54e in the lower handle ring 44 and received in threaded bosses 62a, 62b, 62c, 62d, etc., formed as integral enlargements of the upper handle ring part 32. To facilitate relative positioning and interlocking engagement of the two housing sections, each edge of handle ring part 32 is formed with downwardly projecting circumferential ribs 33, 35 that are respectively received in upwardly facing circumferential grooves 37, 39 formed in edges of the handle ring part 44.

With the two housing section parts bolted together, the two mating ring parts form a rigid and continuous hollow handle that provides not only a fully circumscribing protective bumper but also forms a convenient, secure and protected mounting for electrical elements for control of the machine.

Motor 10 includes a motor case having fixed to the lower end thereof an enlarged circular plate 74 that provides a lower mount for the motor. Lower shell section 42 has an inwardly extending peripheral flange 76 that carries an upwardly projecting circular rib 80 that intersects a plurality of circumferentially spaced radial fastening ribs 82, 84, 86, etc. At each intersection is formed a boss 88, 90, 92, etc. having an internally threaded insert (not shown) that receives a respective one of a plurality of bolts 94, 96, etc., extending through the perimeter of motor mounting plate 74. Thus the motor is securely connected to the housing at strongly reinforced fastening points.

The shell part or housing section 25 has its upper end reinforced by a plurality of circumferentially spaced radially inwardly extending ribs 102, 104, 106, 108.

An integral downwardly facing circular rib 114 on the upper shell part provides a snug recess that receives and firmly positions a decreased diameter section 116 at the upper end of the motor casing, to thereby locate the motor casing both radially and axially without requiring any other fastening devices at this end. The arrangement is such that the bolts 94, 96, etc., draw the casing upwardly against the lower shell section and thus force the upper end of the casing into the casing receiving recess of circular rib 114. The configuration of the reinforcing ribs 102, etc., allows use of motors of various casing sizes, and, if necessary, these ribs may be arranged to collectively engage and position other sizes and shapes of motor casing.

Handle support part 38 of the upper shell section is formed with a keyhole shaped slot 120 in which is captured a self-supporting but resilient sleeve 122 carrying an electric current supply cord 124 adapted to be connected to a source of current for the motor. The corresponding handle support 50 of the lower housing section is enlarged, as indicated at 126, to provide a cavity 128 that receives and guides the electric line 124 extending through the sleeve 122.

Electric line 124 is connected to the motor and to the body 130 of a push button switch indicated generally at 132. Switch body 130, which is of a generally rectangular configuration, is received and snugly seated within a mating cavity 133 formed by a downwardly offset wall 134 in the support 46 of the lower or forward housing section. Support part 34 of the upper handle ring part carries a pair of integrally formed forwardly projecting pins 140, 142 which are mutually radially displaced and positioned at opposite sides of the cavity 133. Pins 140, 142 are received in mating apertures formed in radially extending flanges 144, 146 respectively, fixed to the body 130 of the switch. A movable control button 148 is mounted in the switch body and protrudes through an aperture 150 formed in the support part 34 of the upper or rear housing section. In the illustrated arrangement, the push button switch needs no other securement to the housing handle since the assembly of the two handle parts positions support 34 and pins 140, 142 over and into apertures in the switch body flanges 144 and 146 and urges the switch body forwardly against cavity wall 134. Thus the switch is firmly and securely mounted yet need only be dropped into the recess 133 prior to assembly of the two housing sections.

Preferably switch 132 is of the momentary contact type, requiring a constant pressure on the button to complete the connection between the power line 124 and the motor 10. With this type of a momentary action switch, (e.g., a switch being in stable condition only in off position), greater safety is provided for the operator and the likelihood of damage to the polisher itself is greatly minimized. Where a switch having two stable positions is used, a common "on-off" type switch, the polisher may continue to run even when it is not being held or controlled by the operator. Thus should the polisher be dropped, it may continue to run and damage the surface that is being polished or damage the machine itself. Further, should the machine be stopped by disconnecting the power line rather than by operating the on/off switch, it will immediately start when the power line is again plugged in if such an on/off switch remains in the "on" position. In such case motion of the machine will cause it to be upset with a consequent probability of damage.

Figure 5:
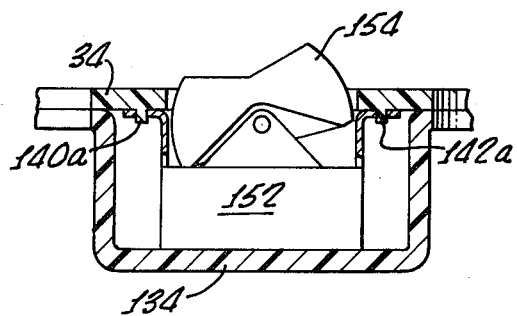
FIG. 5 illustrates the mounting of an alternative type of motor controlling switch.

However, in some cases, such an on/off switch may be required (instead of the momentary push button switch) and thus the offset wall portion 134 of shell handle support 46 provides a somewhat cross-shaped cavity. The cavity 133 is elongated radially (see FIG. 3) to receive the body of push button switch 132. It is also elongated in a tangential direction to receive an alternative switch body 152 (FIG. 5) that has a rocker type actuator 154. For such a rocker type actuator, support 34 would have the aperture 150 thereof shaped to conform to the generally rectangular actuator configuration instead of being circular as for the use of the push button switch. The body 152 of the rocker switch is also snugly received in cavity 133 (instead of the body of the push button switch) and held in place by downwardly projecting pins 140a, 142a which cooperate with the switch flanges in the manner described for pins 140, 142 and switch 132.

It will be seen that the hollow handle, having integral hollow support parts, provides a convenient and effective mounting for control components of the motor, including the motor control switch and portions of the connecting lines. The hollow split handle allows the controlling switch to be positioned at a most convenient location. For the momentary contact switch, which must be subject to operator's finger pressure during the entire operation, the switch is positioned so that with the operator's right hand normally grasping the handle section between handle supports 34 and 36, the thumb of this hand will naturally fall directly over the switch operator 148 or over the actuator 154 where a rocker type switch is used. Although it is presently preferred to mount the switch in the hollow support parts of the hollow handle, it will be readily appreciated that this switch and/or the electric part conducting lines therefor and for the motor, alternatively may be mounted within the hollow ring portions 32, 34 of the circumscribing handle.

Polisher pan 20 is formed as a shallow cylinder or dish open to the top and having a short upwardly extending peripheral cylindrical wall 160 terminated in a peripheral outwardly extending circumferential flange 162. Adhesively secured to the polisher pan 20 is a resilient pad formed of a styrofoam ring 166 adhesively secured to a continuous urethane pad 170 which may be faced with a pad of ensolite (not shown). To insure proper driving connection between the adhesively secured pads and the pan 20, flange 162 is significantly enlarged radially and a plurality of radially extending cleats 174, 176, 178, 180 are fixed to the exterior of the pan, abutting the radially outward surface of wall 160 and the downwardly facing surface of flange 162. The cleats key the resilient pad 166 to the pan and significantly increase the effective restraint upon relative rotation of the pad and pan, thus insuring that the pad will always rotate and otherwise move together with the driven pan 20. In ordinary use a buffing cover (not shown) is secured over the outer surface of the pad and is readily detachable for cleaning and replacement. A separate skirt 182 is bolted to the lower shell section to guard moving components.

A simple, effective, rugged and economical housing has been described. The housing provides a more secure mounting for the motor, firmly positioning and securing both ends of the motor casing. The housing is preferably formed by injection molding or vacuum forming of the two mating sections of PVC or ABS plastic or other suitable plastic, having a good impact resistance. Each part of the hollow handle is integral with its respective housing section and the entire housing is thus readily assembled by simply bolting the two housing sections to each other.

The use of an integral hollow housing not only provides a more effective convenient and useful arrangement for mounting electrical motor control components such as the switch and parts of the lines, but also provides a more economical handle since the thin-wall hollow handle parts, when molded, cool more readily in the mold and thus decrease mold cycle time. Thus, a surprising and unexpected advantage of the hollow handle, in addition to its convenience for positioning and mounting the electrical components, is a significant decrease in manufacturing costs due to the shorter molding time (as compared with a solid handle).

Figure 6:
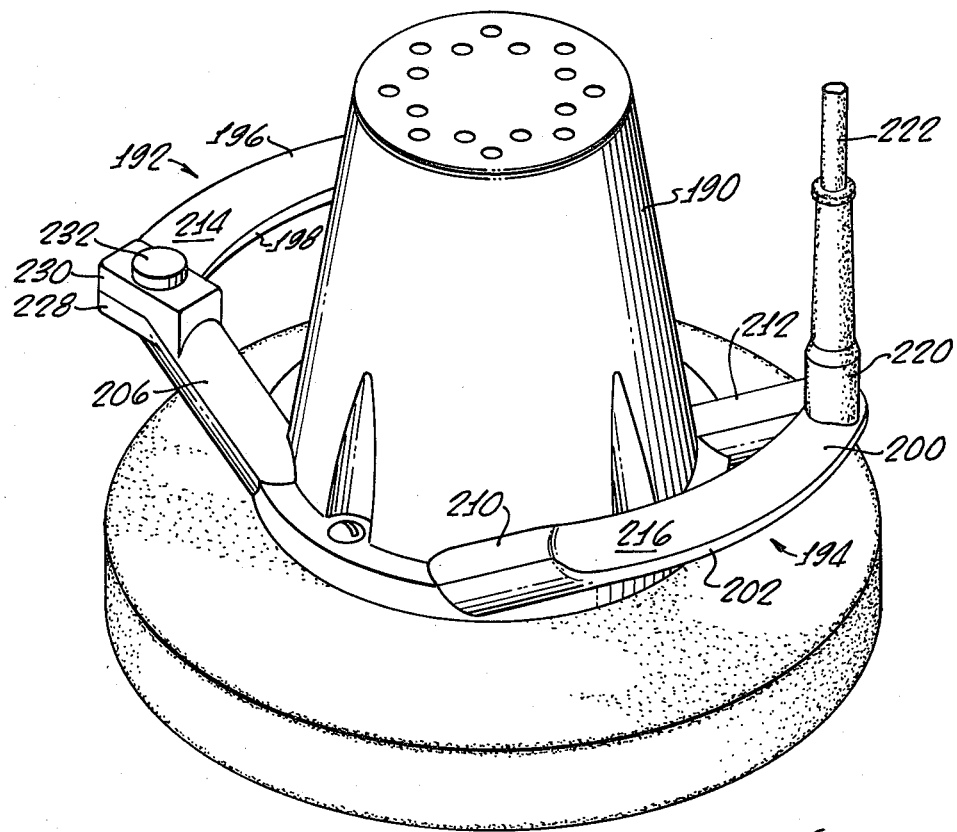
FIG. 6 is a perspective view of a modified form of machine housing.
Figure 7:
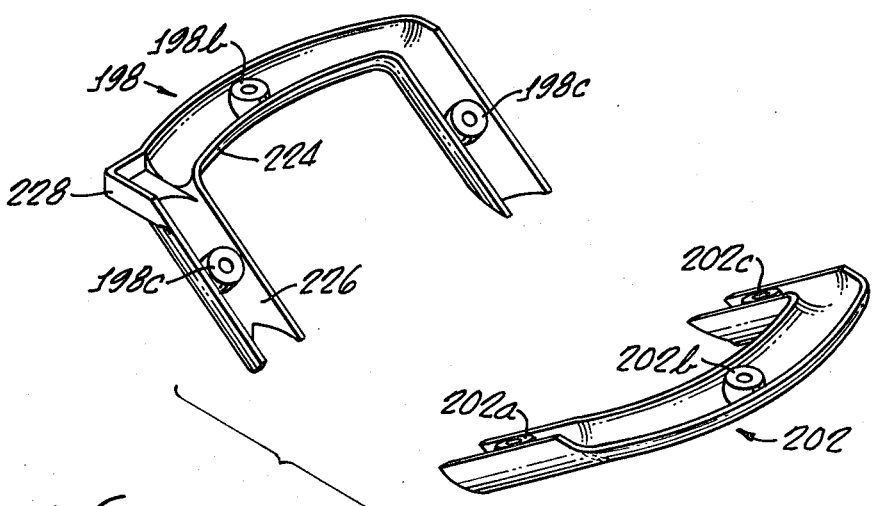
FIG. 7 is a perspective view of the forward handle parts of the housing of FIG. 6.

Illustrated in FIGS. 6 and 7 is a polisher housing having an interior configuration that may be substantially identical to the interior configuration of the housing previously described. The housing of FIGS. 6 and 7, however, is formed in one piece, except for two handle parts. This housing has a unitary one-piece molded shell 190. Instead of a single completely circumscribing handle, housing shell 190 is formed with a pair of diametrically opposed hollow U-shaped handle assemblies 192, 194. Each handle assembly is formed of two handle parts of relatively thin wall downwardly and upwardly concave elements 196, 198 and 200, 202, respectively. Handle assembly 192 includes a substantially U-shaped split hollow body having first and second handle parts 196, 198 joined to each other by bolts (not shown) extending through apertures 198a, 198b and 198c in forward part 198. Similarly handle assembly 194 includes a substantially U-shaped split hollow body having first and second handle parts 200, 202 joined to each other by bolts (not shown) extending through apertures 202a, 202b and 202c in forward part 202. Upper handle part 196 of handle assembly 192 has a pair of legs of which one is designated at 206. Upper handle part 200 of the other handle assembly 194 has a pair of legs 210, 212. Leg 206 and its companion leg of handle assembly part 196 extend outwardly and upwardly from the shell 190 and are integrally formed with the shell. Similarly, legs 210 and 212 of handle assembly part 200 are integral with the shell and extend outwardly and upwardly therefrom. The two upper handle parts, 196 and 200, have the legs thereof respectively connected at outer ends by handle bight portions 214, 216.

The lower or forward handle assembly parts 198 and 202 are separate and detachable. They are also U-shaped, mating with the U-shaped handle assembly parts 196, 200, respectively, and are likewise concave, being concave upwardly to complement the downward concavity of the rear handle assembly parts. Thus the parts collectively define the hollow U-shaped handle assemblies 192, 194. The junction between one leg 212 and the bight 216 of the upper part of handle assembly 194 is formed with an aperture to receive and capture a flexible self-supporting electric line sleeve 220 through which extends a current carrying line 222.

The junction of the bight 224 and one leg 226 of lower handle assembly part 198 of handle assembly 192 and the corresponding junction of the upper handle part 196 are provided with cavity forming walls 228, 230 that receive the body of a momentary push button switch (like switch 132 of FIGS. 1-4) having a switch actuator 232 that projects through an aperture formed in handle assembly part 196. The two parts of each handle assembly are detachably connected together as previously described.

Thus this embodiment of the polisher housing is formed in three sections, the first section being the single shell section 190 together with its two integral handle assembly upper parts 196 and 200, and the other two sections comprising the two detachably connected handle assembly lower parts 198 and 202. Again a rugged integral housing assembly is provided with a split hollow handle that not only mounts suitable electrical components, such as the switch and parts of the electric line, but also provides the unexpected improvement in mold time due to the use of thin wall hollow parts. In addition, this configuration also provides a simplified assembly of housing section elements.

The foregoing detailed description is to be clearly understood as given by way of illustration and example only, the spirit and scope of this invention being limited solely by the appended claims.

What is claimed is:

1. For use with a hand held automobile polisher having an electric motor connected to orbitally drive a polishing pad, an improved polisher housing comprising, a housing shell having
an outer peripheral side wall, a shell cover connected to said wall at one end thereof,
an elongated hollow handle spaced outwardly of and at least partly circumscribing said housing shell, said handle being formed of first and second handle parts joined to one another along a surface that extends longitudinally of said elongated handle, one of said handle parts being integral with said housing shell, the other of said parts being attached to said one part, and electrical elements for controlling said motor mounted to and at least partly within said hollow handle,
said electrical elements including a switch for controlling flow of electrical current to said motor, said switch having a switch body positioned within said hollow handle, and a switch operator projecting from said hollow handle,
one of said handle parts being formed with a cavity receiving said switch body, the other of said handle parts being formed with an aperture for receiving said switch operator,
said shell being formed of first and second interconnected shell parts, said one handle part being integral with said first shell part and said other handle part being integral with said second shell part, said handle parts including mutually mating handle rings circumscribing said shell and mutually mating integral handle supports extending radially between said shell parts and said rings.

2. For use with a hand held automobile polisher having an electric motor connected to orbitally drive a polishing pad, an improved polisher housing comprising, a housing shell having
an outer peripheral side wall,
a shell cover connected to said wall at one end thereof,
an elongated hollow handle spaced outwardly of and at least partly circumscribing said housing shell, said handle being formed of first and second handle parts joined to one another along a surface that extends longitudinally of said elongated handle,
one of said handle parts being integral with said housing shell, the other of said parts being attached to said one part, and electrical elements for controlling said motor mounted to and at least partly within said hollow handle,
said electrical elements including a switch for controlling flow of electrical current to said motor, said switch having a switch body positioned within said hollow handle, and a switch operator projecting from said hollow handle,
one of said handle parts being formed with a cavity receiving said switch body, the other of said handle parts being formed with an aperture for receiving said switch operator,
said handle including first and second handle assemblies, each assembly comprising a substantially U-shaped split hollow body having first and second substantially U-shaped handle assembly parts joined to each other, one of said U-shaped handle assembly parts of each assembly having legs extending outwardly from said shell and integral therewith, the other of said handle assembly parts of each assembly being connected to said one handle part.

3. The apparatus of claim 2 including a power line inlet sleeve connected to the hollow body of said first handle assembly and communicating with the interior thereof.

4. A hand held automobile cleaning and waxing tool comprising
a cleaning and waxing pad,
an electric motor connected to said pad for driving the pad with an orbital motion,
a housing, and
means for mounting said motor to and within said housing,
said housing comprising,
a plastic shell having a continuous side wall circumscribing said motor,
a housing top bridging said side wall and secured to one end thereof, and
an elongated longitudinally split hollow handle having upper and lower thin wall handle parts joined to each other along surfaces that extend transversely of the axis of rotation of the motor, one of said handle parts having first and second mutually spaced legs formed integral with said shell and extending outwardly therefrom and a bight portion interconnecting outer ends of said legs,
means for connecting the other of said parts to said one part to define said hollow handle, and
at least one electrical element connected to control said motor mounted within said hollow handle.

5. The automobile cleaning and waxing tool of claim 4 wherein said electrical elements comprise an electrical switch having a body mounted within said hollow handle and having a switch operator projecting from said hollow handle.

6. The apparatus of claim 5 wherein said electrical elements include electrically conductive wires extending through said hollow handle and connected to said motor and to said switch.

7. The apparatus of claim 6 wherein said hollow handle comprises a first concave handle part extending at least partly around said shell and forming an integral part thereof and a second mating concave handle part connected to said first handle part.

8. The apparatus of claim 7 wherein said hollow handle comprises first and second diametrically opposed U-shaped handle assemblies, each said assembly having a first U-shaped concave handle assembly part integrally formed with said shell and extending outwardly therefrom and having a second concave U-shaped handle assembly part connected to said first handle assembly part of the respective handle assemblies, a switch mounting aperture formed in one of said concave handle assembly parts, an electrical switch body mounted within said hollow handle member adjacent said aperture, and a switch actuator connected with said switch body and projecting through said switch aperture in said hollow handle.

9. A hand held automobile cleaning and waxing tool comprising
- a cleaning and waxing pad,
- an electric motor connected to said pad for driving the pad with an orbital motion,
- a housing, and
- means for mounting said motor to and within said housing,
- said housing comprising
  - a plastic shell having a continuous side wall circumscribing said motor, a housing top bridging said side wall and secured to one end thereof, and
  - an elongated longitudinally split hollow handle having first and second thin wall handle parts joined to each other, one of said handle parts being formed integral with said shell,
  - means for connecting the other of said parts to said one part to define said hollow handle, and
  - at least one electrical element connected to control said motor mounted within said hollow handle,
- said shell comprising first and second shell parts respectively integral with said first and second handle parts, said hollow handle circumscribing said shell and spaced outwardly therefrom.

10. A hand held automobile cleaning and waxing tool comprising
- a cleaning and waxing pad,
- an electric motor,
- an eccentric pad drive connected to and between said motor and pad,
- first and second housing sections,
- means for mounting said motor to and within said housing sections,
- said first housing section comprising
  - a first shell part having a continuous side wall substantially closed at an upper end thereof and open at a lower end,
  - a first handle part having a downwardly concave ring circumscribing said shell part and spaced outwardly therefrom at said lower end, and
  - a plurality of circumferentially spaced first handle supports extending between said shell part and ring, said shell part, handle part and supports all being integral with one another,
- said second housing section comprising
  - a second shell part having a continuous side wall open at an upper end thereof, a second handle part having an upwardly concave ring circumscribing said second shell part and spaced outwardly therefrom at said upper end of said second shell part side wall,
  - a plurality of circumferentially spaced second handle supports extending between said second shell part and said second ring, said second shell part, said second ring and said second supports all being integral with one another, and
- means for connecting said housing sections to each other with the lower and upper ends of said first and second shell parts mating to form a unitary shell, said first and second spaced handle supports mating to form a plurality of circumferentially spaced unitary supports and said rings mating to form a unitary hollow handle ring fixed to and spaced from said unitary shell by said circumferentially spaced unitary supports.

11. The tool of claim 10 wherein one of said housing sections is formed with a switch-receiving cavity spaced outwardly of its shell part side wall and including a motor controlling switch having a body snugly received within said cavity, at least one of said unitary supports being hollow and an electrically conductive wire extending from said switch body through said hollow support to said motor.

12. The tool of claim 10 wherein said means for mounting said motor to and within said housing sections comprises a motor support plate fixed to and extending radially outwardly of a lower end of said motor, a plurality of circumferentially spaced fastening ribs fixed to the interior of said second shell part adjacent the lower end thereof, and means for connecting said support plate to said fastening ribs.

13. The tool of claim 12 wherein said means for connecting said support plate to said fastening ribs comprises a circular reinforcing rib projecting upwardly within the lower end of said second shell part and intersecting said fastening ribs, and a plurality of threaded bosses secured to said second shell part at intersections of said ribs.

14. The tool of claim 10 wherein said means for mounting said motor to and within said housing sections comprises a motor positioning rib fixed to the interior of said first shell part at said upper end thereof in positioning engagement with the exterior of said motor at an upper end thereof to locate the upper end of said motor within said housing sections.

15. The tool of claim 10 including a pad holder plate having a driving connection to said motor, said plate comprising a shallow cylindrical body having a flanged upper end and a plurality of circumferentially spaced cleats fixed to said body and projecting radially outwardly therefrom, and a resilient pad mounted to and over said cylindrical body and keyed against rotation relative to said body by said radially projecting cleats.

16. The tool of claim 10 wherein one of said handle supports is formed with a switch receiving cavity and a second one of said handle supports that mates with said one support is formed with a switch operating aperture, and including a switch having a switch body snugly received within said cavity and a switch actuator projecting through said switch operating aperture, whereby said switch actuator may be operated by the thumb of a hand encircling said hollow handle ring.

17. The tool of claim 16 wherein said switch is a momentary switch requiring a continuous pressure on the switch actuator to maintain the switch in closed position, whereby the switch is open and the motor de-energized when the tool is not held by an operator.

* * * * *